Aug. 19, 1952  J. V. S. DAHLGREN  2,607,065
WINDSHIELD WIPER
Filed Oct. 15, 1945  12 Sheets-Sheet 6

Inventor:
John Victor Stanley Dahlgren
By Williams, Bradbury & Hinkle
Attorneys.

Aug. 19, 1952 J. V. S. DAHLGREN 2,607,065
WINDSHIELD WIPER
Filed Oct. 15, 1945 12 Sheets-Sheet 7

Inventor:
John Victor Stanley Dahlgren
By Williams, Bradbury & Hinkle
Attorneys.

Aug. 19, 1952     J. V. S. DAHLGREN     2,607,065
WINDSHIELD WIPER Filed Oct. 15, 1945     12 Sheets—Sheet 9

Patented Aug. 19, 1952

2,607,065

UNITED STATES PATENT OFFICE 2,607,065

WINDSHIELD WIPER

John Victor Stanley Dahlgren, Chicago, Ill., assignor to Stewart-Warner Corporation, Chicago, Ill., a corporation of Virginia Application October 15, 1945, Serial No. 622,238

27 Claims. (Cl. 15—253)

This invention relates to a windshield wiper and a drive mechanism therefor which is particularly designed to actuate the wiper over a rectangular-shaped area of the windshield.

One object of the invention is to provide a new and improved windshield wiper arranged to clean a rectangular-shaped area of the windshield.

Another object of the invention is to provide a new and improved windshield wiper which includes mechanism for guiding the wiper blade over a rectangular-shaped area of the windshield, said mechanism including a minimum number of parts moving in the field of vision of the driver.

A further object of the invention is to provide a new and improved windshield wiper arranged to clean a rectangular-shaped area of the windshield and to be operated by a single actuating arm deriving its motion from a fulcrum point adjacent the edge of the windshield.

It is also an object of the invention to provide a new and improved windshield wiper and drive mechanism therefor, including means in the drive mechanism for definitely locating the wiper and its carrying arm structure in a particular parking position at one edge of the windshield when the wiper is not in use.

A further object of the invention is to provide a windshield wiper and improved drive mechanism therefor arranged to clean a rectangular-shaped area of the windshield and designed to have sufficient rigidity and mechanical efficiency to withstand exposure to air streams at high speeds.

Another object of the invention is to provide a windshield wiper with drive mechanism adapted to operate the wiping member at a sufficiently high rate of oscillation to keep the windshield clean during heavy rain and with a single blade operating on each half of the windshield.

More specifically, it is an object of the invention to provide a new and improved windshield wiper mechanism arranged to traverse the wiper horizontally across the windshield for cleaning a substantially rectangular area thereof and including a crank arm having a rocking movement about a fixed axis, an oscillating lever member actuated by said crank arm, and means for reciprocating the lever in the direction of its length to produce a substantially straight line motion of the end of the lever which carries the windshield wiper blade.

The invention also includes means for connecting the blade to the oscillating lever and mechanism for maintaining the blade in a position substantially parallel to itself throughout its horizontal traverse of the windshield.

In addition to the foregoing it is an object of the invention to provide a new and improved windshield wiper mechanism with means for predetermining the position at which the mechanism will stop and so designed that at said position the wiper blade may be parked adjacent and parallel to one edge of the windshield.

Other objects and advantages of the invention will appear from the following description taken in connection with the drawings, in which:

Fig. 1a is a continuation of Fig. 1, showing in elevation the lower portion of the windshield, on a somewhat larger scale, together with driving mechanism for the windshield wiper;

Fig. 3 is an elevational view similar to Figs. 1 and 2 but showing the wiper blade and its carrying arm at the limit of its range of movement opposite to that illustrated in Fig. 1;

Fig. 3a is a continuation of Fig. 3 showing the lower portion of the windshield on a larger scale together with parts of the operating mechanism positioned to correspond with the position of the wiper blade in Fig. 3;

Fig. 6 is a vertical longitudinal section taken substantially as indicated at line 6—6 on Fig. 2a;

Fig. 6a is a continuation of Fig. 6 and illustrates the windshield wiper and the upper end of its carrying arm structure;

Fig. 7 is a detail sectional view taken as indicated at line 7—7 on Fig. 2a;

Fig. 8 is an enlarged horizontal sectional view taken as indicated at line 8—8 on Fig. 6;

Fig. 9 is a fragmentary sectional view on an enlarged scale to illustrate certain details of the mechanism shown in Fig. 6;

Fig. 10 is a sectional detail view showing the bearing structure for the lower end of the oscillating lever which transmits motion to the windshield wiper;

Fig. 11 is a detail section at a vertical plane taken substantially as indicated at line 11—11 on Fig. 6a;

Fig. 13 is a fragmentary detail sectional view taken at line 13—13 on Fig. 7;

Fig. 14 is an enlarged detail section taken as indicated at line 14—14 on Fig. 8;

Fig. 15 is an enlarged detail section taken as indicated at line 15—15 on Fig. 8;

Fig. 16 is a transverse detail section at line 16—16 on Fig. 6a;

Fig. 17 is a transverse detail section at line 17—17 on Fig. 6;

Fig. 18 is a detail view taken substantially as indicated at line 18—18 on Fig. 15;

Fig. 19 is an enlarged axial sectional view of the combined main switch and control mechanism being taken as indicated at line 19—19 on Fig. 1a;

Fig. 20 is a face view of the control mechanism as indicated at line 20—20 on Fig. 19 and including a wiring diagram.

Figure 1:
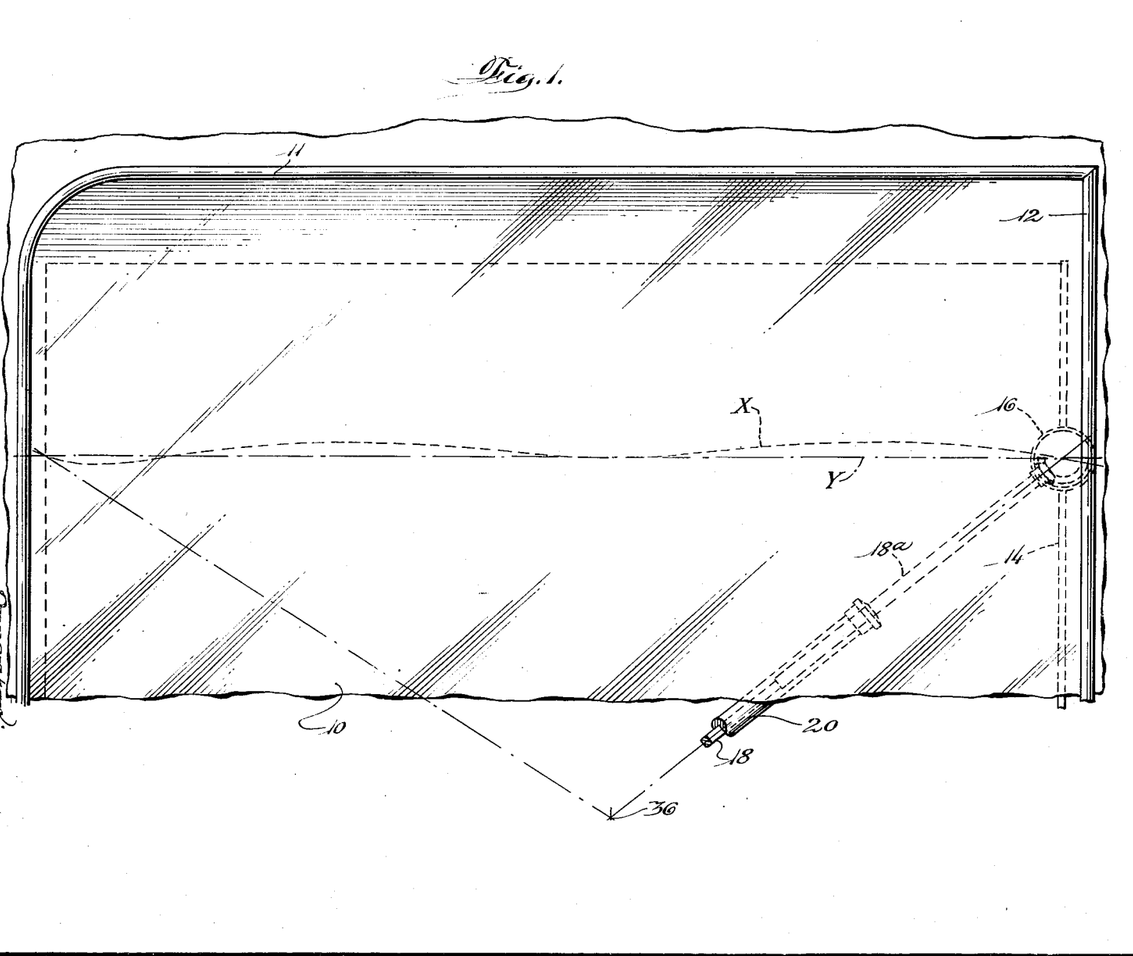
Fig. 1 is an elevation as viewed from the driver's seat, showing the upper portion of one-half of a vehicle windshield together with the wiper blade and the actuating arm therefor, which constitute a portion of this invention.

In a windshield wiper it is of course desirable that the wiper blade traverse as large an area as possible of the windshield or window which the driver or pilot of the vehicle depends upon for his view. In an automobile, this window usually is rectangular in shape, but in most cases it is convenient to provide actuating power for a wiper blade in the form of an oscillating shaft and to transmit motion from such shaft to the blade by means of a swinging arm. Normally, this would actuate the blade in an arcuate path so that only a segmental portion or curved strip of the windshield area would be traversed. The present invention, however, provides a mechanism whereby an oscillating lever arm swinging about a single axis causes the wiper blade to move along a substantially straight path so as to sweep a rectangular area of the windshield. In Fig. 1, the upper portion of one-half of the windshield is shown at 10 with its marginal frame 11 engaging one side and the top, and with a vertical frame member 12 which may be understood as disposed at the middle of the windshield at the inner edge of the portion 10. If it is desired to keep both halves of the windshield clean, the mechanism of this invention may be duplicated at the right hand side, but for purposes of illustration and description the drawings show only the mechanism for cleaning the portion 10 in front of the driver's seat. The wiper blade 14 is shown in dotted lines in this view attached to a carrying head 16 at the outer end of a shaft 18 which extends from a tubular carrying arm 20. As shown in Fig. 1a, which includes the lower portion of the windshield section 10 and the bottom member 13 of its frame, the tubular arm 20 is seen extending rigidly from a cylindrical case 22 having a fixed circular back wall 24 which is secured by screws 26, 26 to a mounting plate 28 supported in any convenient manner in the vehicle and in a plane slightly forward of the plane of the windshield 10. The cylindrical case 22 is mounted to oscillate about its own axis and the shaft is arranged to slide through the case 22 along a diameter thereof as will be explained more fully hereinafter. The lower end of the shaft 18 is connected by a crank pin 30 to the end of the crank arm 32 which is attached to a gear wheel 34 for oscillation therewith about the axis of said gear. The gear wheel 34 is journalled at 36 on the mounting plate 28 and meshes with a gear segment 38 journalled at 40 on said plate 28. An electric motor 42 is coupled to a worm shaft 44 which meshes with a worm gear 46 having a crank arm 48 fixed to its shaft and coupled to the gear segment 38 by a link 50. The rotation of the crank arm 48 continuously in one direction thus serves to oscillate the gear segment 38 back and forth so that it drives the gear 34 first in one direction and then in the opposite direction. In the particular design shown, the crank arm 32 attached to the gear 34 is thus swung through a total angle of about 264°, which sweeps below the axis of the gear 34; 117° of this range is disposed at one side of the vertical radius through said axis and about 147° is disposed at the other side because it is found desirable to locate the axis of the journal bearing 36, as indicated in Fig. 1, somewhat nearer to one end than to the other end of the windshield panel 10. In some cases it may be possible to arrange this axis exactly at the middle of the range of travel of the windshield wiper and to operate the crank arm through the same angle at both sides of the center.

Figure 2:
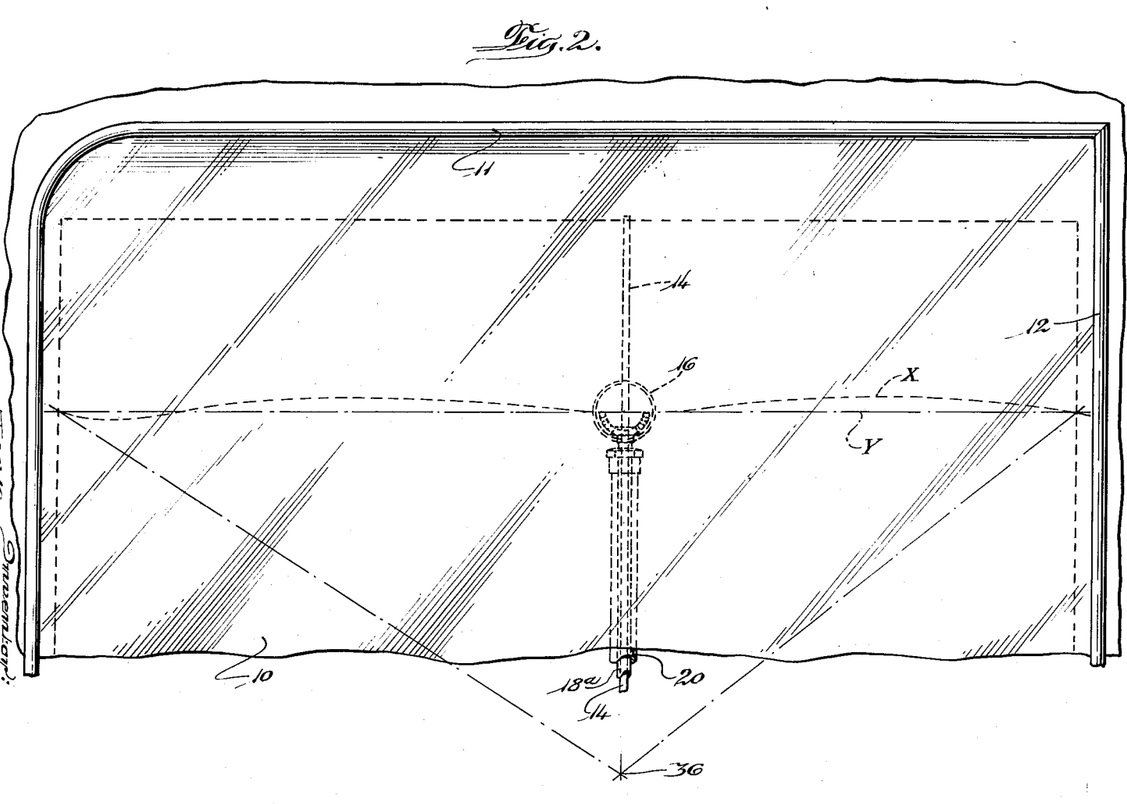
Fig. 2 is an elevational view similar to Fig. 1 but showing the windshield wiper blade and its carrying arm in upright position at approximately the middle of its range across the windshield.
Figure 2A:
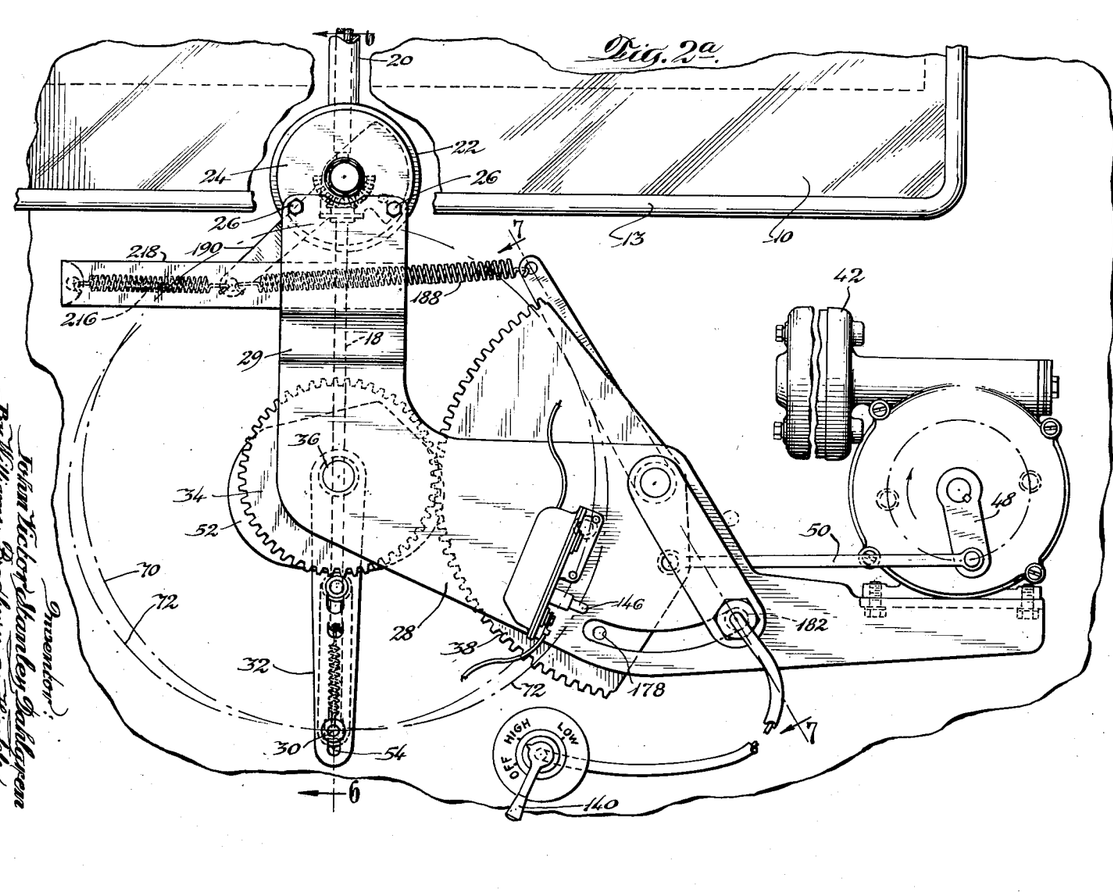
Fig. 2a is a continuation of Fig. 2 on a slightly larger scale, showing the parts of the operating mechanism in positions corresponding to the position of the wiper blade in Fig. 2.
Figures 6, 8, 9, 10:
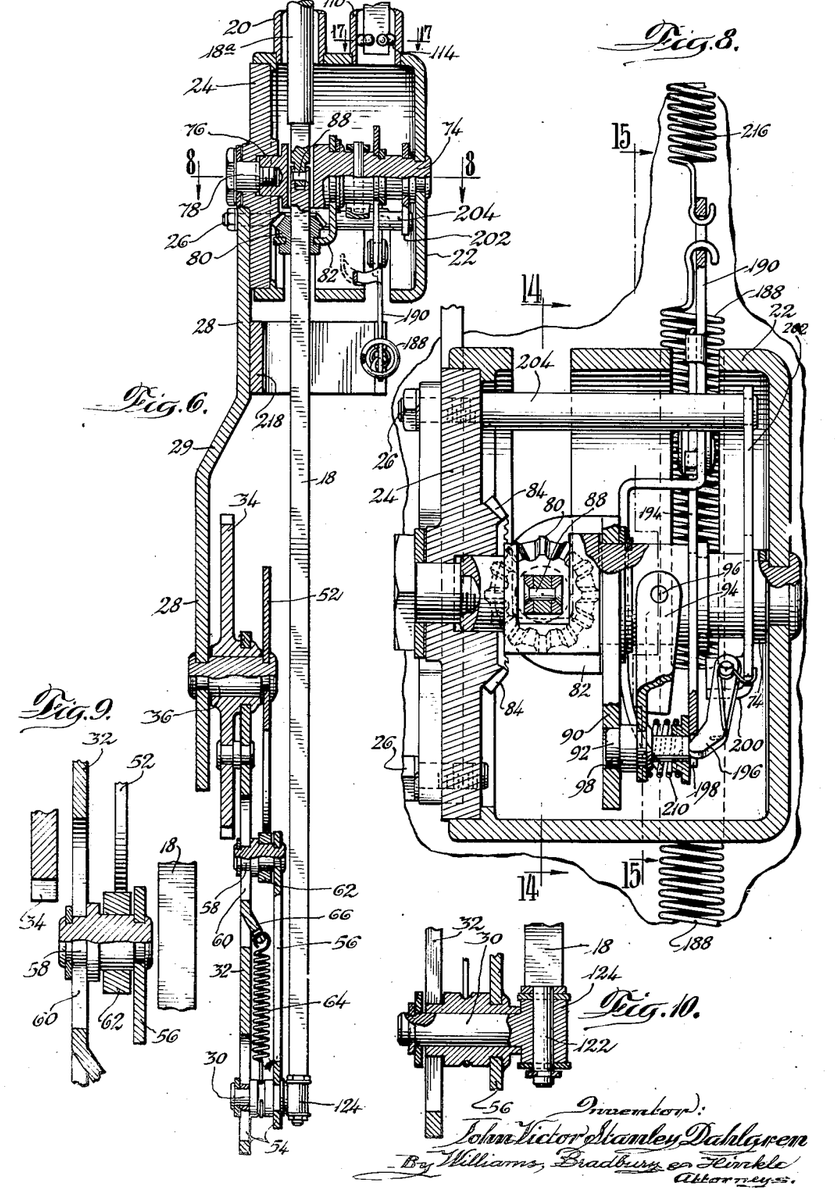

As shown in Fig. 2a, the arm 32 extends vertically downward from the journal axis 36 when the shaft 18 and its carrying arm 20 extend vertically upward from the axis of the case 22, said axis being disposed directly above the journal axis 36. Fig. 6 shows some of the details of this structure in the positions in which they are illustrated in Fig. 2a. The mounting plate 28 is offset at 29 and below this offset it supports the journal stud 36 on which the gear wheel 34 is mounted.

If the crank pin 30 were fixed at the outer end of the arm 32, the resulting motion of the upper end of the shaft 18, as indicated by the dotted line X in Figs. 1, 2, and 3, would not approximate a straight line as closely as necessary for the purpose of this device; accordingly, this movement is modified slightly by providing a fixed cam 52 secured to the inner end of the journal stud 36. The crank pin 30 is mounted in a slot 54 extending longitudinally in the arm 32, and a link 56 connects the pin 30 with a stud 58 which is slidable in a second slot 60 in the arm 32 and carries a roller 62 engageable with the periphery of the cam 52. A spring 64, extending between the crank pin 30 and an anchor prong 66 struck out of the crank arm 32, holds the roller 62 yieldingly in contact with the cam 52, causing it to follow the contour thereof as the arm 32 swings through its range so that instead of moving in a strictly circular arc 70, the crank pin 30 follows the path 72 and the outer end of the shaft 18 moves along in a straight line as indicated at Y in Figs. 1, 2, and 3.

Referring to Fig. 6, it will be seen that the case 22 is journalled for rotation about its axis, being rotatably engaged with the circular wall 24. A spindle 74 staked to the case 22 extends axially through it and a reduced portion of the spindle bears in a recess 76 in the wall 24. A headed screw 78 secured in the end of the spindle 74 anchors the case 22 rotatively to its end wall 24. Within the casing 22 the shaft 18 which is of square cross section extends slidably through a square opening in a bevel gear pinion 80 and said pinion is fixedly journalled in a bracket plate 82 which embraces and extends from the spindle 74. As thus located, the pinion 80 meshes with bevel gear teeth 84 formed on the inner face of the fixed wall 24 for a purpose which will be explained hereinafter. The shaft 18 is in two parts and includes the portion 18a which extends through the tubular arm 20 and is journalled in the outer end thereof at 86 (see Fig. 6a). The part 18 and the part 18a are connected by a hinge pivot 88 and said parts are normally aligned except when folded at this pivot to place the wiper blade and its adjacent parts in parking position. As the angular position of the shaft 18 is changed by the rotation of the crank arm 32 and its crank pin 30, the case 22 turns through a corresponding angle because the bracket 82 which includes a portion embracing the spindle 74 also includes a radially extending clutch plate portion 90 with which a clutch pin 92 is normally engaged. Said clutch pin 92 is carried by a yoke 94 secured by a pivot 96 to the spindle 74 and the clutch pin 92 normally occupies an aperture 98 in the plate 90. Thus as the pinion 80 follows the swinging movement of the shaft 18, it is controlled by the journalling of its bracket plate 82 on the spindle 74 and swings about the axis of said spindle. This movement of the bracket 82 causes its clutch plate portion 90 to swing about the axis of the spindle 74 and to rotate the spindle with it by virtue of the interconnection between the plate 90 and the spindle 74 provided by the clutch pin 92 and the yoke 94. As the spindle 74 swings about its axis, it carries with it the case 22 and the tubular arm 20 in which the outer portion 18a of the shaft 18 is supported and journalled. Thus, the oscillating motion of the gear 34 causes an oscillating motion of the shaft 18 and of the case 22 to which it extends.

At the same time the shaft 18 slides longitudinally through the pinion 80 within the case 22 and through the bearing 86 at the outer end of the tubular arm 20 and carries with it a hollow head 100 which includes bracket means 102 having a pivot 104 by which the windshield wiper blade 14 is carried. The head 100 is steadied and prevented from rotating about the axis of the shaft 18a by means of a guide bar 108 which is longitudinally slidable in a guide tube 110 of square cross section extending rigidly from the case 22 in parallel relation to the tubular arm 20. Bearing balls 112 are retained in individual recesses near the outer end of the tube 110 and in engagement with the surfaces of the guide bar 108, and near the inner end of the tube 110 the bearing balls 114 are disposed in recesses in the bar 108 and in bearing engagement with the wall of the tube 110. The outer end of the bar 108 is bent at right angles and includes a reduced cylindrical portion 116 with which the end wall 118 of the head 100 is rotatably engaged. The bent portion of the bar 108 fits between cheeks 106 cast in the head member 100. A locking washer 120 fitted in a groove in the part 116 retains said end wall thereon. This arrangement permits the head 100 to move through a limited distance toward and from the outer ends of the tubes 20 and 110 in response to the longitudinal movement of the shaft 18 which results from its connection with the crank pin 30 as the latter is rotated about the axis 36 of the gear 34 and is shifted along the crank arm 32 by the cam 52.

The shaft 18 is of square cross section throughout most of its length and at the portion which fits slidably in the bevel gear pinion 80, but at its lower end it is turned down to form a journal 122, and a bearing 124 is provided therefor on the end of the pivot or crank pin 30 as seen in Figs. 9 and 10. The meshing of the pinion 80 with the teeth 84 causes the pinion to rotate as the shaft 18 swings about the axis of the case 22 and its end wall 24 so that the shaft 18 and its connection portion 18a are thus rotated, and this motion is communicated by a bevel pinion 126 at the upper end of shaft 18a to bevel gear teeth 128 formed on the inner face of the wall 118 of the head member 100. This part 118 is rotatable in the head 100 and the wiper blade 14 connected to the bracket portion 102 of the part 118 turns with it as the shaft 18a and its enclosing tube 20 swing through the angle of operation which causes the wiper blade to traverse the windshield panel 10. The ratios of these gear connections are so calculated as to turn the wiper blade 14 with respect to the head 100 just enough so that throughout the travel of the wiper blade across the windshield it is maintained in a substantially vertical position parallel at all times to its original position; and since the path of travel of the axis of the head 100 as rectified by the operation of the cam 52 is a straight line Y, as already explained, the wiper blade operates to clear a rectangular field or area of the windshield panel 10, sweeping back and forth across this rectangular area as the motor 42 continues to oscillate the gear segment 38 and the gear wheel 34.

Figure 4:
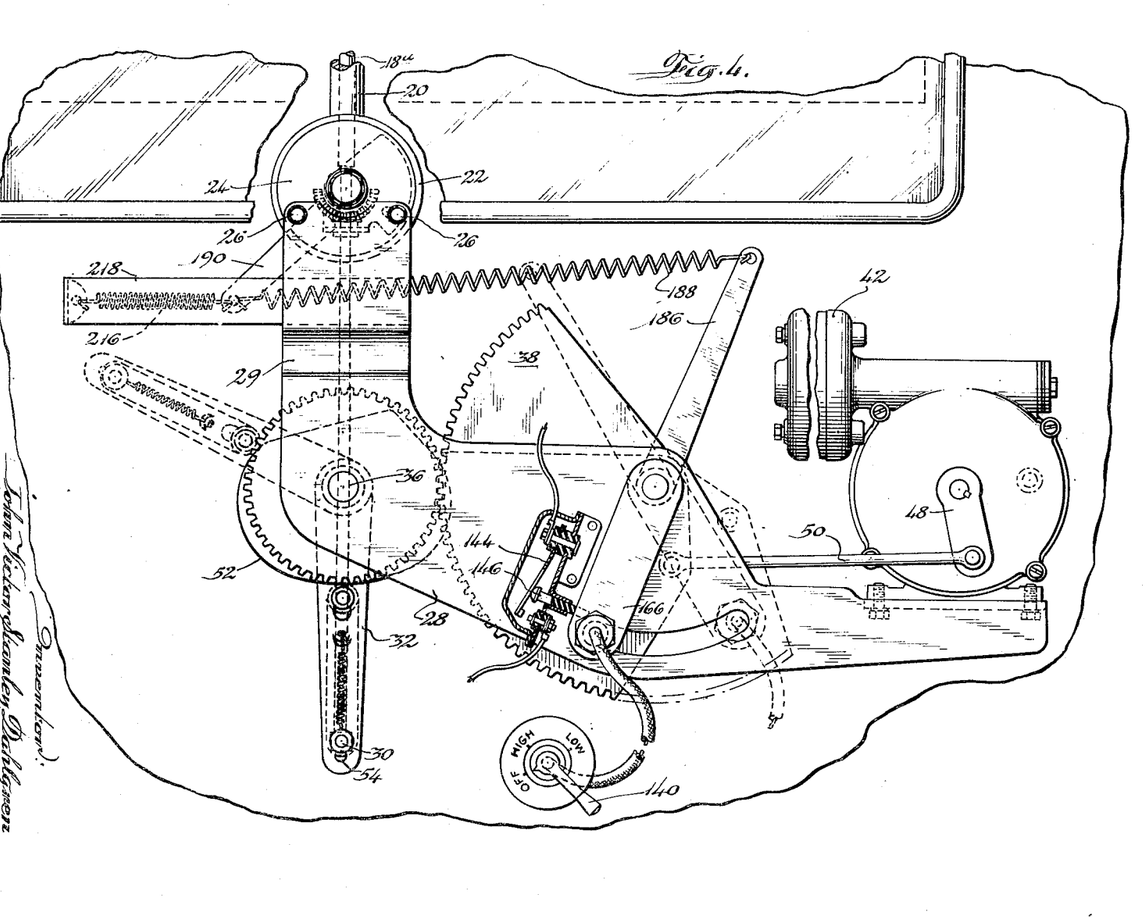
Fig. 4 is a view similar to Figs. 1a, 2a, and 3a, but showing the control switch moved to the "off" position and showing the parking control lever adjusted for determining the position at which the wiper blade will be arrested and parked.
Figure 5:
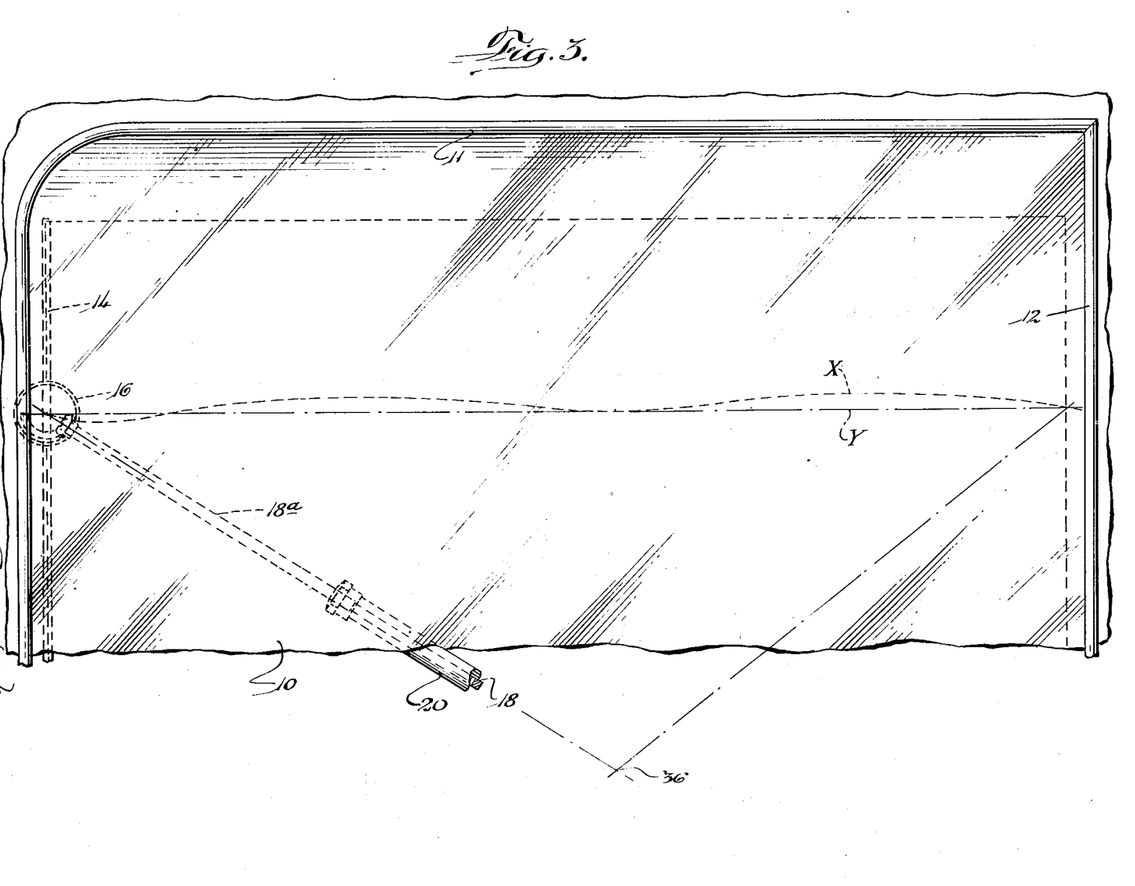
Fig. 5 is a view similar to Fig. 4, but showing the wiper blade and its carrying arm disposed in parking position.
Figures 6A, 7, 11, 12, 13:
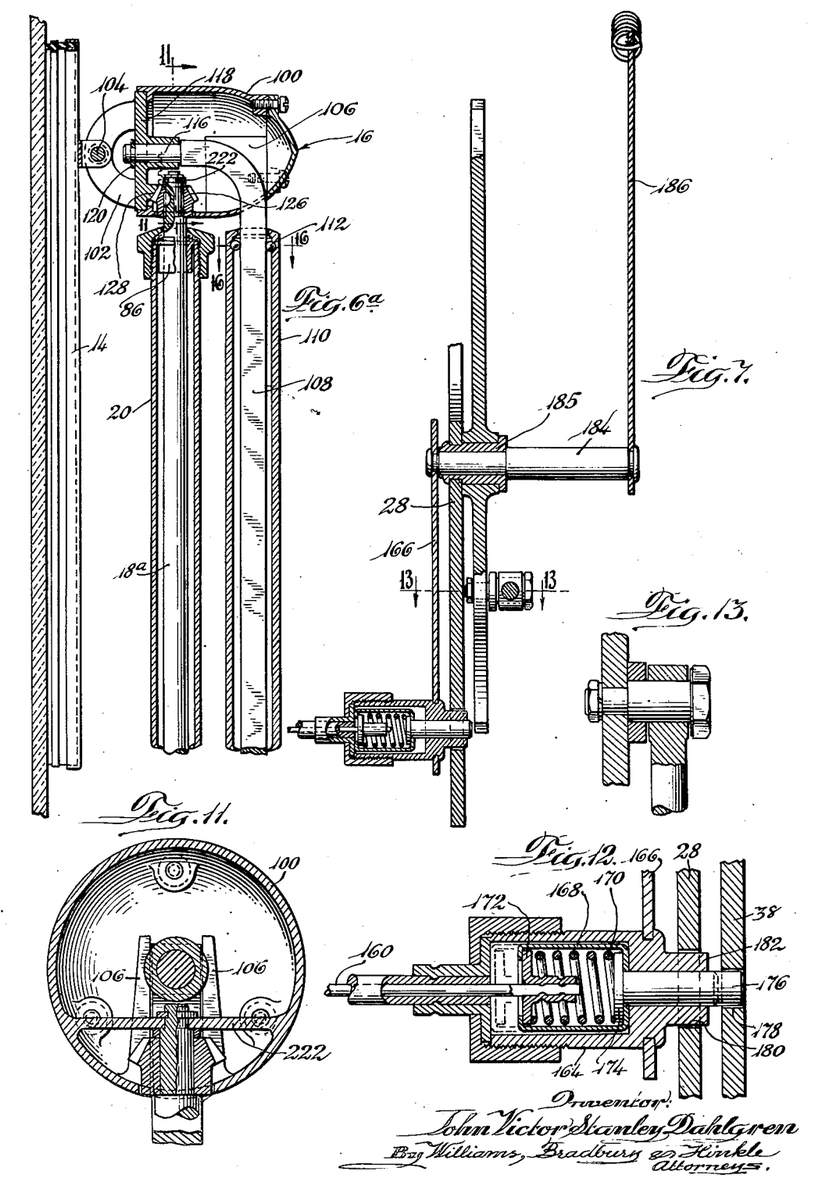
Figure 12:
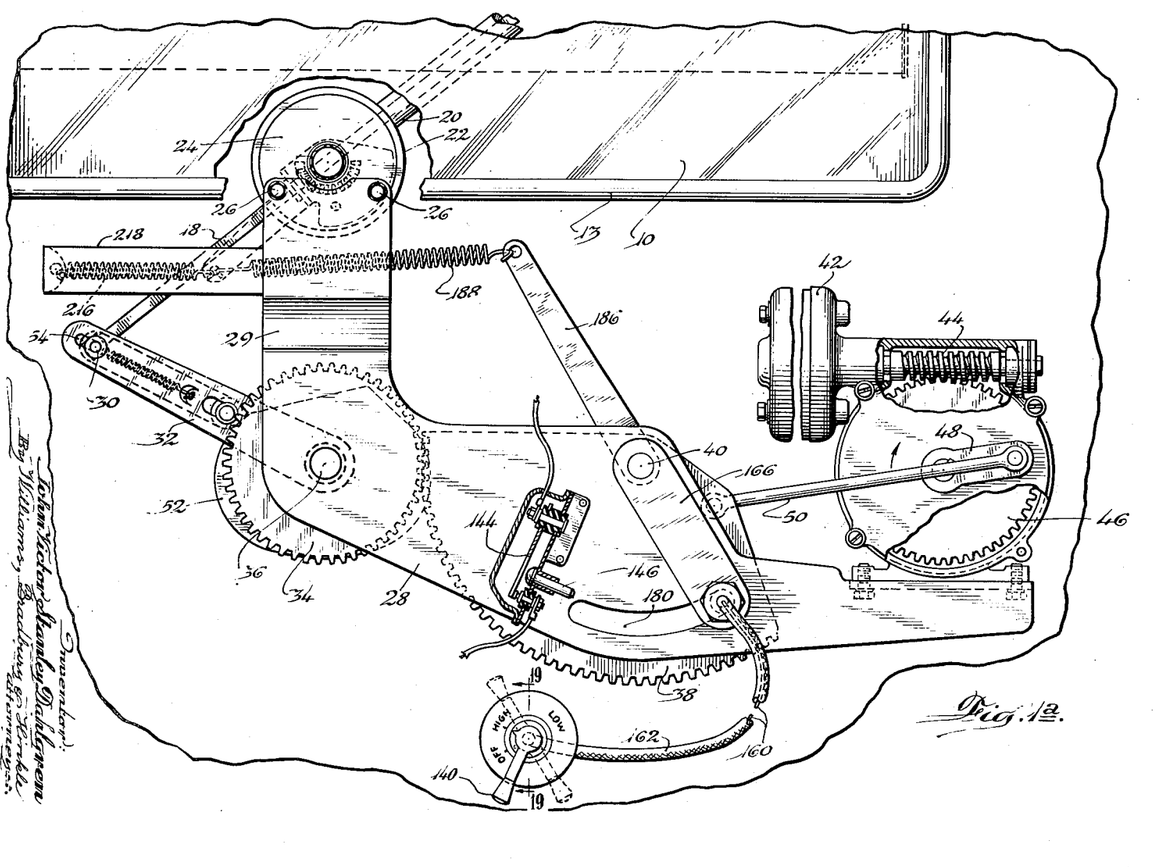
Fig. 12 is an enlarged fragmentary detail section illustrating the disengageable connection between the driving segment and the lever which determines the parking position of the wiper blades.
Figures 19, 20:
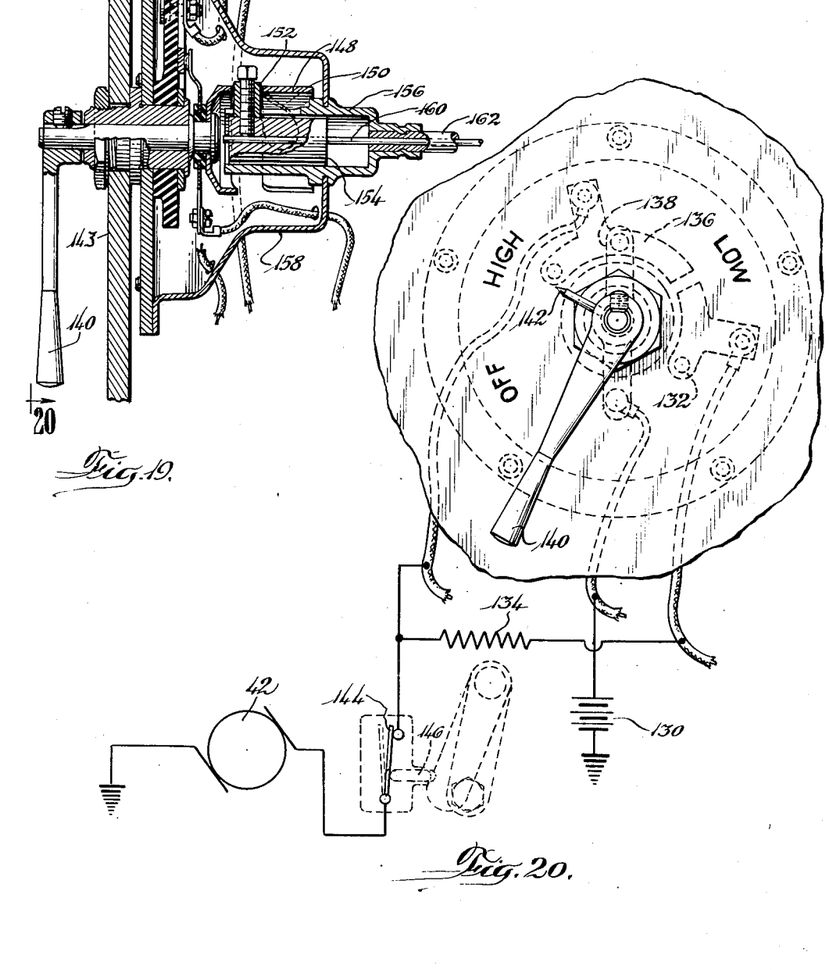

The motor 42 is operated from a current source indicated at 130 on Fig. 20, and is controlled by a switch mechanism which includes a low speed contact 132 in circuit with a resistance 134, a high speed contact 136 and a rotatable contact arm 138 operable by a switch handle 140. The handle includes an indicator point 142 which traverses a dial plate 143 with markings "off," "high," and "low," as shown in Fig. 20. A limit switch 144 is included in the motor circuit and is provided with an actuating button 146 operable as hereinafter described. In addition to controlling the operation of the motor 42, the switch handle 140 actuates mechanism which automatically causes the shaft 18, 18a and the carrying arm 20 to be arrested at vertical position, as shown in Fig. 4, and then automatically swings the arm 20 and shaft 18a to the horizontal parking position illustrated in Fig. 5. When handle 140 is moved to the "off" position, it rotates a cam cylinder 148 to a position at which its helical cam slot 150 shifts the follower 152 on a plunger 154 in a guide cylinder 156 which is carried by the switch casing 158. The plunger 154 is attached to one end of a Bowden wire 160 extending through a guide tube 162 to a second guide cylinder 164 which is secured rigidly to one end of a lever arm 166. Within the cylinder 164 a hollow plunger 168 encloses a spring 170 which is disposed between a piston head 172, captive within the plunger 168 and the head 174 of a clutch pin 176 mounted slidably within the cylinder 164. When the Bowden wire 160 is advanced by the turning of the handle 140 to the "off" position, it compresses the spring 170 and forces the end of the clutch pin 176 against the face of the gear segment 38 so that when a hole 178 in the gear 38 registers with the clutch pin 176, the latter is snapped into the hole 178 as shown in Fig. 12 and thus interlocks the lever arm 166 with the gear segment 38. The initial position of the arm 166 is that shown in Fig. 1a, but upon engagement of the clutch pin 176 with the gear segment 38 the arm 166 will be swung through an angle limited by the arcuate slot 180 in the supporting bracket 28, the guide cylinder 164 having a reduced portion 182 which extends into the slot 180, as seen in Fig. 12. The lever arm 166 thus moves to the position shown in Fig. 4 at which it depresses the button 146 of the limit switch 144, opening the circuit of the motor 42 and arresting operation of the mechanism with the shaft 18a and its enclosing tubular arm 20 in upright position.

The lever arm 166 is secured rigidly to one end of a shaft 184 journalled in a bearing bushing 185 which is supported in the mounting bracket 28 and upon which the gear segment 38 is rotatably mounted. The other end of the shaft 184 carries a lever arm 186 which thus swings in unison with the arm 166, and when the latter moves to the position shown in Fig. 4 to actuate the limit switch 144, the arm 186 operates to tension a spring 188 which connects the arm 186 with a lever arm 190 extending downwardly from the case 22.

Figures 14, 15, 16, 17, 18:
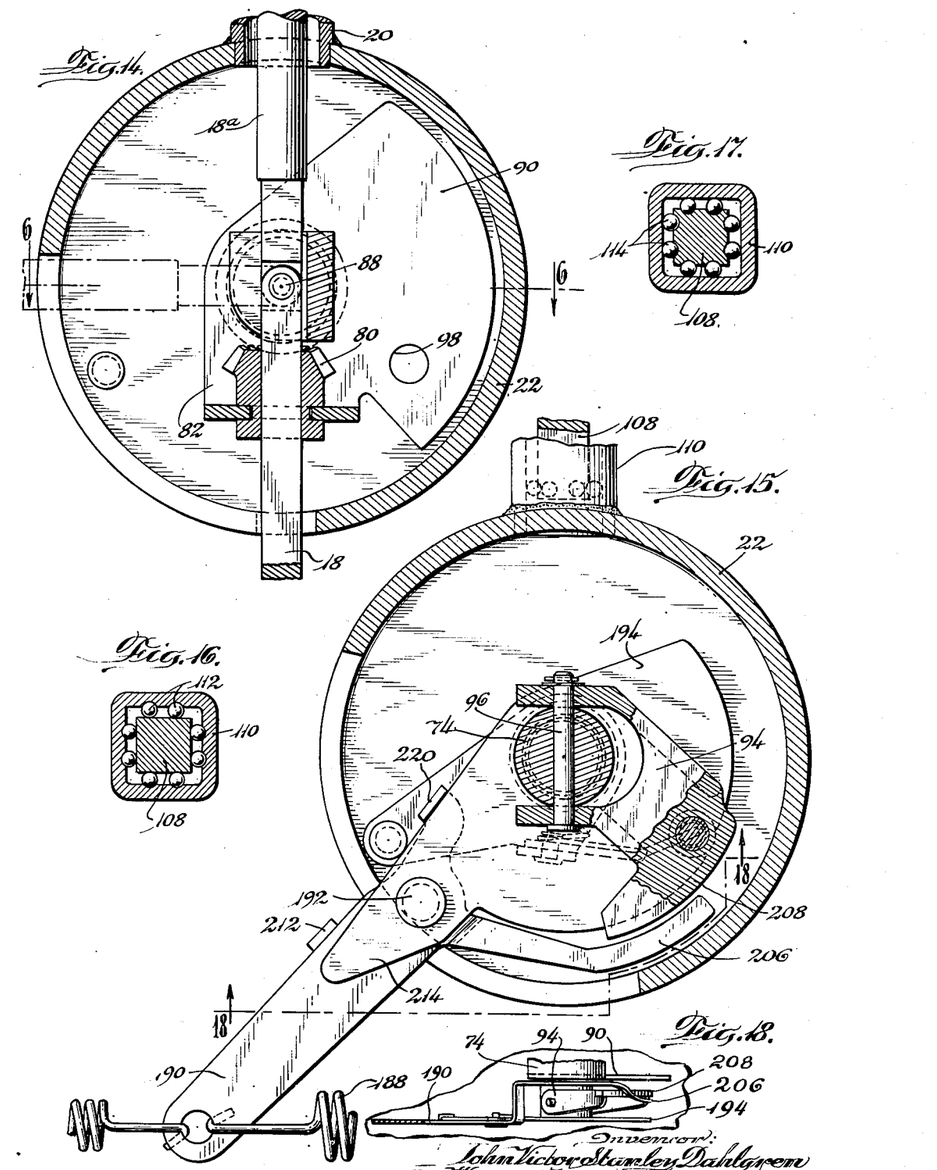

As shown in Fig. 15, the lever arm 190 is connected by a pivot 192 to a plate 194 inside the case 22, said plate being rotatably carried by the spindle 74 but normally held against rotation by a spring pressed dog 196, more clearly seen in Fig. 8. One end of the dog 196 engages a notch 198 in the plate 194 and at the other end the dog is pivoted to a lug 200 of a bracket plate 202 carried on the spindle 74 and anchored by engagement with an extension 204 of one of the fastening screws 26. The lever 190 includes an offset portion 206 which is bent past the plane of a wing portion 208 of the yoke 94 so that the initial movement of the lever 190, in response to tension of the spring 188, swings the bent or offset part 206 of the lever into camming engagement with the wing 208 and rocks the yoke 94 through a small angle about its pivot 96. The wing portion 208 of the yoke carries the clutch pin 92 as seen in Fig. 8, and the clutch pin is held normally in engagement with the plate 90 by means of a spring 210 reacting against the plate 194. The camming action of the part 206 against the wing 208 swings the yoke 94 sufficiently to withdraw the clutch pin 92 from the plate 90, thus disconnecting the yoke 94 from the bracket 90 and permitting rotation of the spindle 74 and case 22 relative to the bracket plate 90 and gear pinion 80 with which it is inter-engaged. As one end of the clutch pin 92 is thus withdrawn from the plate 90, the other end operates to force the dog 196 out of the notch 198, thus leaving the plate 194 free to turn with respect to the bracket plate 202 and the fixed wall 24 of the case 22. The lever arm 190 has a lug 212 which engages a prong 214 of the plate 194 after the initial movement of the arm 190 has rocked the yoke 94 and withdrawn the clutch pin 92 from the plate 90 as just described. Further movement of the arm 190 thus carries with it the plate 194 and the yoke 94 which has become interlocked with the plate 194 by engagement of the clutch pin in the notch 198. The tension set up in the spring 188 is sufficient to swing the arm 190 through an angle of about 90°, thus causing the yoke 94 and spindle 74 attached thereto to turn through a similar angle, rotating the case 22 through 90° and swinging the carrying arm 20 from its vertical position, as seen in Fig. 4, to horizontal parking position, as shown in Fig. 5. When this occurs, the coupling pivot 88 between the shaft 18 and the shaft 18a is positioned as shown in Figs. 6 and 14 at the axis of the case 22 and spindle 74 so that as the case 22 and carrying arm 20 are rotated through the 90° angle, the upper section 18a of the shaft swings freely about this pivot 88 and assumes its horizontal parking position and there is no strain on the connected parts. Since the wiper blade 14 is maintained in a vertical position throughout its travel across the windshield and is controlled positively by the position of the wall 118 of the head 100, the blade will be disposed in its vertical position parallel to the tubular arm 20 when the parking operation is commenced, and will remain parallel to the arm 20 as the latter swings to horizontal position.

To re-start operation of the wiper blade, the control handle 140 is swung to position its indicator 142 either at the "high" mark of the dial or at the "low" mark, so that operative contact is established for the circuit of the motor 42. The circuit will remain open as long as the limit switch 144 stays open, but movement of the handle 140 away from the "off" position will rotate the cam cylinder 148 and cause the follower 152 and its plunger 154 to be retracted in the cylinder 156 to the position shown in Fig. 19. This will retract the Bowden wire 160 and withdraw the hollow plunger 168 to the position shown in dotted lines in Fig. 12, and in full lines in Fig. 7, at the same time withdrawing the clutch pin 176 from the hole 178 in the gear segment 38. As shown in Fig. 5, the movement of the parts to parking position under the retractile force of spring 188 results in tensioning the spring 216 which is also connected at one end to lever arm 190 and is anchored at the other end to a laterally extending arm 218 attached to the mounting plate 28. Upon withdrawal of the clutch pin 176 from the segment 38 the tension in the spring 216 will operate to swing the arm 190 back to its normal position and this movement operating through the spring 188 will initiate the movement of the lever arms 186 and 166 toward their original position, thus withdrawing the lever 166 from the limit switch button 146 and permitting the limit switch 144 to close, whereupon the motor circuit is re-established.

The contraction of the spring 216 is accompanied by very little extension of the spring 188 since the lever arm 166 is free to return to the opposite end of the arcuate slot 180, and as the spring 216 contracts it swings the lever arm 190 back to its original position. This movement first swings the plate 194 back toward its original position, carrying with it the yoke 94, which is interlocked with the plate 194 by engagement of the small end of the pin 92 in the notch 198. The movement of the yoke 94 rotates the spindle 74 and the case 22 to return the arm 20 and the shaft 18a to vertical positions. In the initial portion of this return movement, however, the arm 190 will swing about its pivot 192 through a small angle sufficient to bring its lug 220 into engagement with the edge of the plate 194 as shown in Fig. 15, and in this position the offset or cam portion 206 of the arm 190 will be withdrawn from the path of the wing portion 208 of the yoke 94 so that the spring 210 can return the clutch pin 92 into engagement with the bracket plate 90. When the tubular arm 20 and the shaft 18a reach the upright position shown in Fig. 2a, the spring 210 moves the clutch pin 92 out of the notch 198 in the plate 194 and into the hole 98 in the bracket plate 90. Thereafter the wiper blade will be actuated by oscillation of the gear 34 and the arm 32 to which the shaft 18 is connected.

It will be recognized that the shaft 18 and its extension 18a perform a four-fold function. Since the outer end of the shaft 18a is anchored to the wall 118 of the head 100 by its bearing engagement in the bridge or web 222 of the head 100 as seen in Fig. 11, the shaft may be considered as an arm which carries the wiper blade. The upper portion of the shaft constitutes a driving arm which extends radially from the casing 22 for oscillation with it while the lower portion of the shaft serves as means to oscillate the casing 22 and the wiper carrying arm about the fixed axis of the casing. In addition, the shaft 18, 18a being slidable through the casing 22 and being thus reciprocated by the motion of the crank arm 32 serves to vary the distance between the axis of oscillation and the connection of the blade to the arm which carries it, thus insuring movement of the blade in a substantially straight path across the windshield. A further function of the shaft 18, 18a is performed as it is rotated by meshing of the bevel gear 80 with the teeth 84 so that the shaft shall cause the wiper blade to turn on the pivotal bearing 116 and maintain its vertical position throughout its travel across the windshield. In folding to parking position the shaft 18, 18a may be even considered as performing a fifth function; namely, retaining the wiper blade in alignment with the shaft 18a as it is swung to parking position; this results from the hinged connection between the parts 18 and 18a at 88 which must be axially aligned with the spindle 74 to permit the folding movement. This means that the rotation of the shaft 18 by its bevel gear 80 must be so calculated as to bring the hinge pivot 88 into alignment with the spindle axis at the instant when it arrives at the level of this axis; then when the part 18a is folded about the hinge pivot, neither section of the shaft can rotate and the part 18 may be considered as serving to lock the part 18a so that the wiper blade cannot rotate during the parking movement. The member 108 acts mainly as a steady arm for the head 100 and rigidity is further added to the mechanism by the tubes 20 and 110 anchored in the casing 22 and swinging with it as it oscillates.

While there is shown and described herein certain structure illustrating the invention, it is to be understood that the invention is not limited thereto or thereby but may assume numerous other forms and includes all modifications, variations and equivalents coming within the scope of the following claims.

I claim:

1. In a windshield wiper, a wiper blade, an oscillating hub having a diametral aperture, a driving arm slidably extending through the aperture in the hub with the blade attached to said arm, and means for sliding said arm through said hub as it oscillates to vary the distance between the axis of the hub and the point of attachment of the arm to the wiper blade for causing said blade to travel in a substantially straight path across the windshield.

2. In a windshield wiper, a wiper blade, a hub mounted for oscillation about a fixed axis, the hub having a diametral aperture, a driving arm extending through the aperture in the hub for oscillation therewith and slidable through said aperture, means securing the wiper blade to one end of said driving arm, a crank arm journalled to oscillate about an axis parallel to the axis of said hub member, a crank pin connecting the other end of said driving arm to said crank arm, and means to oscillate said crank arm for simultaneously oscillating said driving arm about the axis of the hub and sliding said driving arm through said hub.

3. In a windshield wiper, a wiper blade, a member mounted for oscillation about a fixed axis, a driving arm extending radially from the axis of oscillation of said member for oscillation therewith and slidable through said member, means securing the wiper blade to said driving arm, a crank arm journalled to oscillate about an axis parallel to the axis of said member and operatively connected to said driving arm, and means automatically varying the effective length of said crank arm as it oscillates.

4. In a windshield wiper, a wiper blade, a member mounted for oscillation about a fixed axis, a driving arm extending radially from said member for oscillation therewith and slidable through said member, means securing the wiper blade to said driving arm, a crank arm journalled to oscillate about an axis parallel to the axis of said member, a crank pin connecting said driving arm to the crank arm, and means automatically shifting said pin along the crank arm as it oscillates.

5. In a windshield wiper, a wiper blade, a member mounted for oscillation about a fixed axis, a driving arm extending radially from said member for oscillation therewith and slidable through said member, means securing the wiper blade to said driving arm, a crank arm journalled to oscillate about an axis parallel to the axis of said member, a crank pin connecting said driving arm to the crank arm, means supporting said crank pin on the crank arm with capacity for adjustment toward and from the axis of oscillation of said arm, a fixed cam, and a follower connected to said crank pin and engaging the cam for effecting said adjustment of the crank pin as the crank arm oscillates.

6. In a windshield wiper, a wiper blade, a member mounted for oscillation about a fixed axis, a driving arm extending radially from said member for oscillation therewith and slidable through said member, means securing the wiper blade to said driving arm, a crank arm journalled to oscillate about an axis parallel to the axis of said member, said crank arm having a slot, a crank pin engaged in said slot and connecting the crank arm to the driving arm, a cam and a follower therefor, a link supporting said crank pin in said slot and connected to said follower, and a spring connecting said link with the crank arm and tensioned to urge the follower against the cam for causing the crank pin to be shifted as the crank arm oscillates, the contour of the cam rectifying the sliding motion of said driving arm to produce travel of the wiper blade in a straight path.

7. In a windshield wiper, a wiper blade, a casing comprising a fixed end wall and a shell mounted to oscillate thereon, a guide bar extending radially from the shell for oscillation therewith, a bracket pivotally carried by the outer end of said guide bar and supporting the wiper blade, bevel gear teeth on said bracket, a shaft extending through said shell parallel to the guide bar and journalled for rotation about its own axis, means to oscillate the shaft about the axis of the shell and means to oscillate the shell therewith, a bevel gear pinion on said shaft, bevel gear teeth on the fixed end wall of the shell meshing with the pinion and causing the shaft to rotate as it oscillates, and a bevel gear carried by the outer end of the shaft in mesh with bevel gear teeth on said bracket, whereby the bracket and the wiper blade are turned relatively to the guide bar by said rotation of the shaft.

8. In the combination defined in claim 7, means supporting said guide bar slidably from the shell, the means which oscillates the shaft being operative to reciprocate it simultaneously, and means by which the shaft is engaged with the bracket for shifting said bracket and the wiper blade toward and from the axis of oscillation to cause the blade to travel in a substantially straight path across the windshield.

9. In the combination defined in claim 7, said guide bar being slidable radially toward and from the shell, the means which oscillates the shaft including a crank arm oscillating about an axis parallel to that of the shell with a journal bearing for one end of the shaft pivoted to said crank arm, a journal bearing for the other end of the shaft fixed on said bracket, and shoulder means by which the shaft engages both said bearings, whereby the shaft is simultaneously oscillated and reciprocated by the crank arm to move the wiper blade in a substantially straight path across the windshield.

10. In a windshield wiper, a wiper blade, an oscillating member, a driving arm extending radially from said member with the blade attached to said arm, means for sliding said arm through said member as it oscillates to vary the distance between the axis of oscillation and the point of attachment of the arm to the wiper blade, said arm having a hinge joint intermediate its ends, and means for arresting said arm with the axis of its hinge joint at the axis of said oscillating member to permit the blade-carrying portion of the arm to be swung about said axis into a parking position.

11. In a windshield wiper, a wiper blade, an oscillating member mounted for oscillation about an axis adjacent one side of a windshield, a driving arm extending radially from said member, means pivotally securing the blade to said arm, means automatically turning said blade upon its pivot axis to hold it parallel to an initial upright position throughout its travel across the windshield, means for arresting the arm in upright position in alignment with the blade, and means to retain said parts in alignment as they are swung about the axis of oscillation into a parking position adjacent one side of the windshield.

12. In a windshield wiper, a wiper blade, a member mounted for oscillation about an axis adjacent one side of the windshield, a driving arm extending radially from said member with the blade attached thereto, a second arm extending radially from said member, means for oscillating said second arm about the said axis, clutch means normally connecting said second arm to said member for oscillating said member and the driving arm with the blade attached to it, and means for disengaging said clutch means and arresting the oscillating means permitting said member and said driving arm to be swung about said axis to bring the driving arm into alignment with said side of the windshield in its parking position.

13. In the combination defined in claim 12, a parking lever and a parking spring attached at one end to said lever, a tensioning lever attached to the other end of said spring, means operable at will to connect said tensioning lever with the means which oscillates said second arm for causing said lever to tension the parking spring, and means automatically locking said member and the driving arm to the parking lever upon disengagement of aforesaid clutch means, whereby the tensioned parking spring acts through the parking lever to swing the driving arm into its parking position.

14. In the combination defined in claim 12, a parking lever and a parking spring attached at one end to said lever, means connected to the other end of said spring and operable at will for tensioning it, said means for disengaging the clutch means including a shifter actuated by said parking lever when said spring is tensioned, means also actuated by said lever to lock the lever to said member and the driving arm as said clutch is disengaged, whereby further movement of the parking lever by said tensioned spring swings the driving arm into its parking position.

15. In the combination defined in claim 12, said wiper blade being pivotally attached to the driving arm, means automatically turning said blade about said pivotal connection and changing its angular relation to the driving arm as it is carried across the windshield thereby, said means for arresting the oscillating means being effective only when the blade is aligned with said driving arm, and means maintaining said alignment when the driving arm is swung into parking position.

16. In a windshield wiper, a wiper blade, a member mounted for oscillation about an axis adjacent a horizontal side of the windshield, a driving arm extending radially from said member with the blade pivotally attached thereto, a second arm extending radially from said member, means for oscillating said second arm about the said axis, clutch means normally connecting said second arm to said member for oscillating said member and the driving arm with the blade attached thereto, means causing said driving arm to turn about its own axis as it oscillates, gearing transmitting said turning movement to the blade at a rate to maintain it in vertical position throughout its travel across the windshield, whereby said blade is aligned with the driving arm when the latter is upright, and means operable automatically to disengage the clutch means and arrest the oscillating means when said driving arm is in upright position, permitting the driving arm to be swung with said member into horizontal parking position at the side of the windshield with the wiper blade aligned with the driving arm.

17. In the combination defined in claim 16, means locking said driving arm and the wiper blade against rotation when said arm is swung to parking position.

18. In the combination defined in claim 12, the means for oscillating said second arm including an electric motor and a rocking member driven thereby, a switch for said motor and a trip member for said switch, said wiper blade being pivotally attached to the driving arm, means automatically turning said blade about said pivotal connection and changing its angular relation to the driving arm as it is carried across the windshield thereby, said means for arresting the oscillating means including a part engageable at will with said rocking member to move with it and operative to engage the trip member for opening the switch when the wiper blade is aligned with said driving arm.

19. In the combination defined in claim 12, the means for oscillating said second arm including an electric motor and a rocking member driven thereby, said wiper blade being pivotally attached to the driving arm, means automatically turning said blade about said pivotal connection and changing its angular relation to the driving arm as it is carried across the windshield thereby, said means for disengaging the clutch means including a shifter for said clutch means, a lever to actuate said shifter, a spring connected at one end to said lever, a lever arm connected to the other end of said spring, means operable at will to interlock said lever arm with said rocking member to cause the lever to be rocked thereby and to tension said spring, the spring tension actuating the shifter lever to disengage said clutch means when the wiper blade is aligned with said driving arm.

20. In the combination defined in claim 12, the means for oscillating said second arm including an electric motor and a rocking member driven thereby, a switch for said motor and a trip member for said switch, said wiper blade being pivotally attached to the driving arm, means automatically turning said blade about said pivotal connection and changing its angular relation to the driving arm as it is carried across the windshield thereby, said means for disengaging the clutch means including a shifter for said clutch means, a lever to actuate said shifter, a spring connected at one end to said lever, a lever arm connected to the other end of said spring, means operable at will to interlock said lever arm with said rocking member to cause the lever to be rocked thereby and to tension said spring, the spring tension actuating the shifter lever to disengage said clutch means when the wiper blade is aligned with said driving arm, said trip member being positioned for actuation by said lever arm substantially simultaneously with the disengagement of the clutch means.

21. In the combination defined in claim 12, a parking lever and a parking spring attached at one end to said lever, a tensioning lever attached to the other end of said spring, means operable at will to connect said tensioning lever with the means which oscillates said second arm for causing said lever to tension the parking spring, and means automatically locking said member and the driving arm to the parking lever upon disengagement of aforesaid clutch means, whereby the tensioned parking spring acts through the parking lever to swing the driving arm into parking position, together with a return spring also attached to the parking lever and tensioned by the movement of said lever which swings the driving arm to parking position, and manually operable means for releasing the tensioning lever from its connection with the means for oscillating said second arm, permitting said return spring to swing the driving arm from parking position into operative position.

22. In the combination defined in claim 12, a parking lever and a parking spring attached at one end to said lever, a tensioning lever attached to the other end of said spring, means operable at will to connect said tensioning lever with the means which oscillates said second arm for causing said lever to tension the parking spring, and means automatically locking said member and the driving arm to the parking lever upon disengagement of aforesaid clutch means, whereby the tensioned parking spring acts through the parking lever to swing the driving arm into its parking position, together with a return spring also attached to the parking lever and tensioned by the movement of said lever which swings the driving arm to parking position, and manually operable means for releasing the tensioning lever from its connection with the means for oscillating said second arm, permitting said return spring to swing the driving arm from parking position into operative position, such release of the tensioning lever operating to energize said means for oscillating the second arm, thus setting the wiper mechanism in motion.

23. In a windshield wiper, a wiper blade, a member mounted for oscillation about an axis adjacent one side of a windshield, a driving arm extending radially from said member with the wiper blade attached to said arm, means for oscillating said member including an electric motor and a rocking member driven thereby, a switch for said motor and a trip member depressible for opening said switch, a lever arm, means operable at will to engage said lever arm with said rocking member, said lever being swung by said rocking member to depress the trip member to stop the motor with said driving arm at a predetermined position, and a spring attached to said lever arm and tensioned by the movement thereof which actuates the trip member, said means engaging the lever with the rocking member being also operable at will to disengage said lever from the rocking member, whereupon the spring withdraws the lever from the trip member, permitting the switch to close and causing the motor to resume actuation of the windshield wiper.

24. In a cleaner for the windshield of an automotive vehicle or the like, an elongated drive member oscillatable and movable in an endwise direction, a wiper blade adjacent one end of said drive member, means for oscillating said drive member and for moving the same in an endwise direction, and guide means intermediate the ends of said drive member to guide movement thereof including a member oscillatable upon a fixed axis located on one side of said windshield to constrain said drive member for oscillation at said intermediate point upon said fixed axis, and means spaced from said intermediate part of said drive member and rockable with said oscillatable member for guiding endwise movement of the drive member.

25. In a windshield cleaner, an oscillatable member, a fixed support for said oscillatable member, a gear, means to fix said gear for oscillation with said oscillatable member and for rotation on its own axis, an elongated drive member, said drive member and gear being fixed against relative rotation and movable relatively in a direction axially of the gear, a wiper rotatably supported adjacent the outer end of said drive member, means to oscillate said drive member for moving the wiper over said windshield and to move the same in an endwise direction for maintaining the end of said drive member at which said wiper is secured on a straight line as it moves over the windshield, said gear and the means to fix the same against oscillation relative to the oscillatable member forming a driving connection between the latter and said drive member, gear teeth on said fixed support at a position to be engaged by said gear for causing said drive member to be turned upon its axis when said oscillatable member and gear are oscillated, and means including a gear train to turn said wiper when the drive member is turned.

26. In a windshield wiper, an elongated drive member oscillatable and movable in an endwise direction, said member having a hinge joint intermediate its ends, a wiper blade operated by said drive member, means to guide movement of said drive member including a member oscillatable upon a fixed axis, means for oscillating said drive member and for moving the same endwise to carry the axis of said hinge joint across said fixed axis, means including clutch means operatively to connect said drive member and oscillatable member so that said drive member is constrained for oscillatory movement upon said fixed axis, control means including means operable at will and means rendered effective automatically upon operation of the means operable at will to operate said clutch for disconnecting said drive member and oscillatable member when the axis of the joint in said drive member coincides with the axis of said oscillatable member whereby one end of said drive member and said oscillatable member are freed for rocking movement upon said fixed axis independently of the other end of said drive member.

27. In a windshield wiper for cleaning a substantially rectangular area of a windshield, a hub mounted for oscillation about a fixed axis, a driving mechanism to oscillate the hub, first and second generally parallel arms extending radially from the hub for oscillation therewith, means on the hub telescopically engaging the arms to provide for radial extension of the latter, a wiper blade pivotally connected to the outer end of the first arm, means to rotate the second arm about its own longitudinal axis as the arms oscillate, gearing forming a driving connection between the outer end of the second arm and the wiper blade to turn the latter to maintain the latter parallel to its initial position as the arms oscillate, and means forming part of the driving mechanism engaging one of the arms to shift the latter radially for moving the wiper blade in a substantially straight line across the windshield as the arms oscillate.

JOHN VICTOR STANLEY DAHLGREN.

REFERENCES CITED

The following references are of record in the file of this patent:

UNITED STATES PATENTS

| Number | Name | Date |
|---|---|---|
| 1,660,971 | Lindner | Feb. 28, 1928 |
| 1,866,700 | Farmer, Jr. | July 12, 1932 |
| 1,964,109 | Cusset | June 26, 1934 |
| 2,079,399 | Drew et al. | May 4, 1937 |
| 2,233,815 | Horton | Mar. 4, 1941 |

FOREIGN PATENTS

| Number | Country | Date |
|---|---|---|
| 625,469 | Germany | Mar. 20, 1934 |